Patented June 1, 1926.

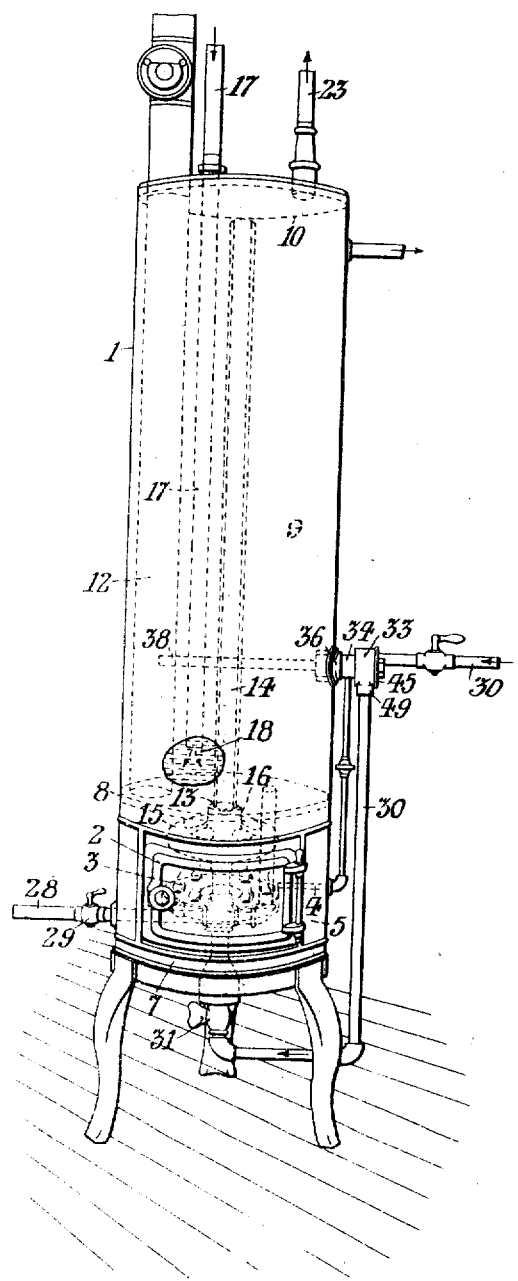

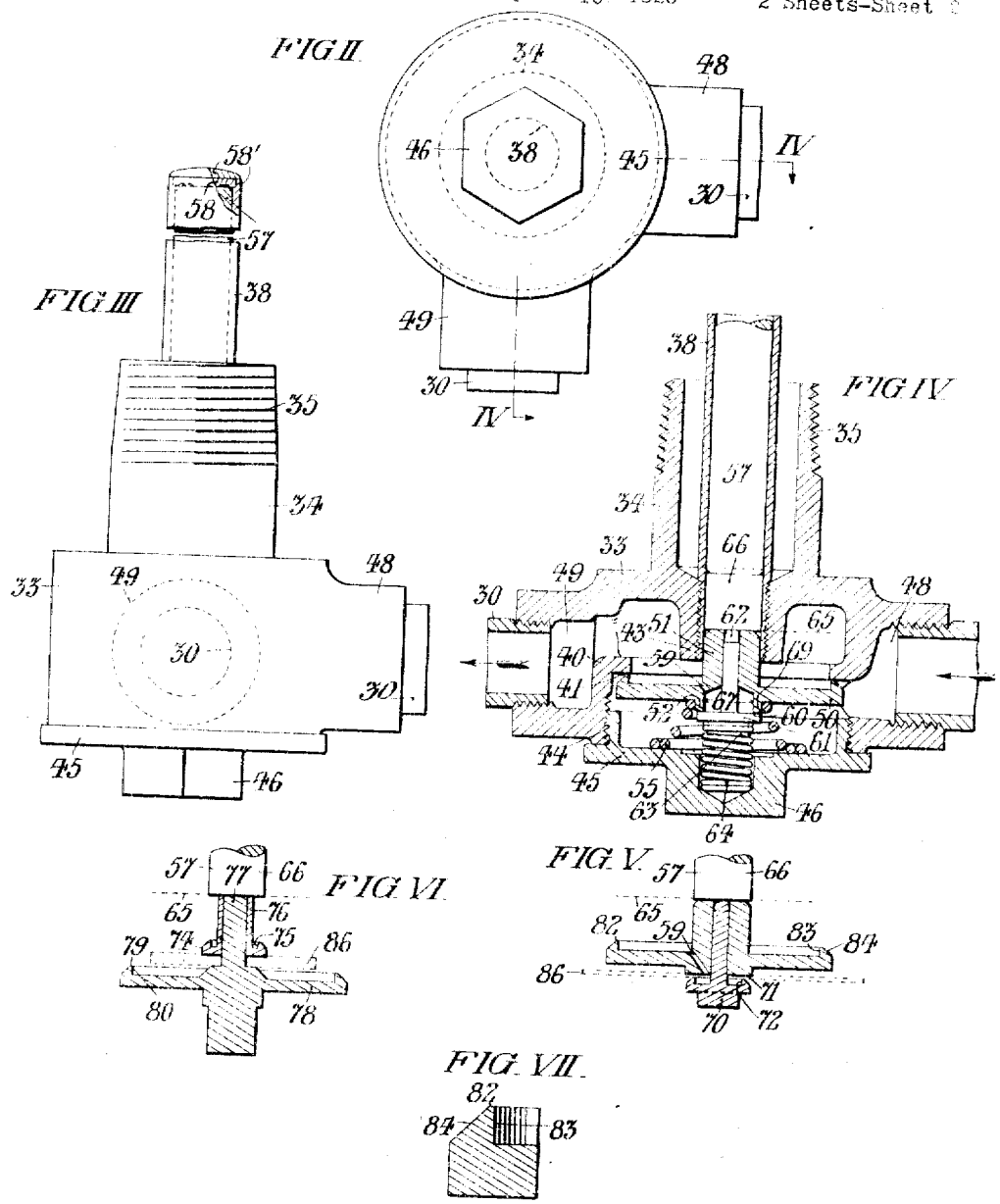

1,587,177

UNITED STATES PATENT OFFICE.

ARTHUR E. PAIGE, OF PHILADELPHIA, PENNSYLVANIA.

THERMOSTATICALLY-CONTROLLED VALVE.

Application filed April 16, 1925. Serial No. 23,461.

My invention relates to valves of the multiple type claimed in Letters Patent of the United States, No. 1,542,573 granted to me June 16, 1925 viz, including two, respectively main and auxiliary, axially reciprocatory puppet elements having stems in coaxial telescopic relation, arranged to control respective main and auxiliary ports. Such valves are designed and adapted for use in connection with a gas water heater included in a house water supply system and comprising a container which is a hot water reservoir; with the object and effect of regulating the temperature of the water stored in said reservoir.

Only a small gas consumption is required to maintain a predetermined temperature of the stored water, until hot water is withdrawn therefrom and replaced by cold water, whereupon, a relatively large consumption of gas is required to quickly regain the loss of heat and restore the water to the predetermined temperature. Therefore, it is characteristic of my invention that means are provided to normally minutely regulate a small volume of gas passing to a burner in such heater and to temporarily permit the passage of a much larger volume of gas to the same burner. In other words; an object and effect of my invention is to provide both a coarse and a fine adjustment and regulation of the flow of gas to the same burner; although in the form of my invention herein disclosed, the burner includes a plurality of flame orifices.

As hereinafter described, my invention includes the combination with a water container; of a burner arranged to heat the water in said container; a main gas valve containing a main fuel gas conduit leading to said burner; a bypass conduit leading to said burner through said main valve (independently of the control of the latter); an auxiliary valve controlling said bypass conduit; a spring arranged to normally close said main valve; a spring tending to close said auxiliary valve; a single thermostatic element, extending in said container, and in operative relation with both said valves, arranged to continually hold said auxiliary valve open, to a variable extent, and thereby vary the effective area of said bypass, in accordance with the temperature of the water in said container, and arranged to open said main valve at a predetermined temperature, and permit said main valve to be closed, by its spring, at a predetermined temperature; whereby the heating effect of said burner is automatically determined and controlled to regulate the temperature of the water in said container and compensate for fluctuations in such temperature, consequent upon withdrawal of hot water and influx of cold water with respect to said container.

My invention includes the various novel features of construction and arrangement hereinafter more definitely specified.

In said drawings: Fig. I is a diagrammatic perspective view of a gas water heater embodying my improvements.

Fig. II is a full size outer end view of the casing of the thermostatically controlled valve mechanism indicated in Fig. I.

Fig. III is a fragmentary plan view of said valve casing and its appurtenances.

Fig. IV is a sectional view, taken on the line IV, IV in Fig. II, showing a construction of said valve casing and the thermostatically controlled valve mechanism contained therein, including a main valve and an auxiliary valve in coordinated relation.

Fig. V is a diametrical sectional view of a modified form of main valve and an auxiliary valve in coordinated relation.

Fig. VI is a diametrical sectional view of another modified form of main valve and auxiliary valve in coordinated relation.

Fig. VII is an enlarged fragmentary radial sectional view showing the characteristic construction and arrangement of the circumferential flange element of the valves and valve seats shown on a smaller scale in Figs. IV, V and VI.

Referring to Fig. I; the cylindrical tubular casing shell 1 has the door 2 in its circumference, affording access to the burners 3 and 4 mounted within the burner compartment 5 in said shell. Said burner compartment is formed by the skirt portion 7 of said shell extending below the partition 8 and including the opening for said door. Said partition 8 forms the bottom closure of the water container compartment 9 in said shell, which has the top closure 10. The flue pipe 12 for the escape of products of combustion from said burner 3 extends through said water compartment 9, parallel with the axis of said casing, but in eccentric relation thereto, and is conveniently rigidly connected with said closures 8 and 10 by welded joints. Said partition 8 has the axial screw threaded opening 13 for the hot water inlet pipe 14 extending upwardly from the water spreader 15, which is interposed between said burner 3 and said partition 8 and has the axial flange 16 provided with an external screw thread fitted in said opening 13. The pipe 17, which is rigidly connected with the top closure 10 of said water container 9, extends nearly to the bottom closure 8 of said container so as to supply the latter with cold water 18 from a municipal or other source.

Of course, any water heated in the structure above described is correspondingly expanded and tends to rise to the top of said container 9; while the relatively cold water 18 gravitates into said spreader 15 through the axial opening within said flange 16 and is distributed radially outward by a diaphragm in said spreader so that it reaches the bottom convex wall of said spreader at its outer circumference and gravitates thence downwardly toward the center of said spreader.

The construction and arrangement of said spreader 15 are such that the cold water thus flowing into said spreader at the perimeter thereof, is heated so as to rise in said axial hot water pipe 14 which extends nearly to the top of said container 9, so that hot water rising through said pipe 14 may be almost directly drawn off through the pipe 23 which leads to the dispensing faucets.

Of course, expansion of the water 18 within said spreader 15 causes precipitation of any solid matter which is normally suspended and carried in the water. Therefore, to enable the operator to eliminate any sediment deposited in the spreader, which would detract from its efficiency of operation; I provide the bottom of the spreader with the drain pipe 28 which has the stop cock 29 exterior to said casing 1, so that, by opening said stop cock, any sediment in the spreader may be rinsed out with the water thus drawn directly downward therethrough.

In the form of my invention indicated in Fig. I; the burner 3 is supplied with gas through the pipe 30, under manual control of the stop cock 31, but also under automatic control of the thermostatically operative fuel valve having the casing 33. Said casing 33 has the tubular extension 34 provided with the screw thread 35 detachably fitted in water-tight relation with the spud 36 in said heater shell 1; so that the thermostatic tube 38 extends horizontally in the water 18 in the container 9 but in tangential relation with a circle larger than the outside diameter of said pipe 14, so as to clear the latter.

Said valve casing 33 has the internal partition 40 with the circular main valve seat 41 thereon in coaxial relation with the plunger bearing 43 and the internally screw threaded seat 44 for the removable closure plug 45, which latter has the wrench hold 46 exterior to said casing. Said valve casing 33 also has the internally screw threaded pipe inlet seat 48 and pipe outlet seat 49 leading from respectively opposite sides of said partition 40.

In the form of my invention shown in Figs. IV and V, the main gas valve 50 is a disk fitted to said valve seat 41 and having axial tubular projections 51 and 52 extending from respectively opposite sides thereof; said projection 51 being a stem by which said main valve 50 is operated as hereinafter described, and said projection 52 serving to engage the spiral spring 55 which is compressed between said plug 45 and said valve 50 and normally tends to close said valve upon its seat and thus shut off the gas supply to said burner 3.

Said main valve 50 is arranged to be automatically operated by the thermostatic couple including said tube 38, (which is conveniently formed of a cut length of a standard size of commercial copper pipe,) and rod 57. Said rod is conveniently formed of carbon or ceramic and in contact with the cap 58 of said tube 38; said cap being permanently rigidly connected to said tube, conveniently by solder 58', at the end of said tube 38 remote from said valve casing 33. The arrangement described is such that said rod 57 is moved axially toward said valve 50 by the contraction of said tube 38; the expansion and contraction of said rod 57 being practically negligible within the range of temperatures to which said couple are subjected in the embodiment described.

Ordinarily, it is desired to permit said main gas valve 50 to be closed by its spring 55 whenever the water 18 in the container 9 reaches 170° Fahrenheit, and to open said valve, automatically, by the operation of said thermostatic couple, whenever the temperature of said water falls below 170° F. That result may be attained by making said rod 57 of such length that it contacts directly with the adjacent end of said valve stem 51, when the valve 50 is closed upon its seat 41 and the water at a temperature of 170° F., as any decrement in the temperature of the water would cause said copper tube 38 to contract and thrust said rod 57 against the valve stem 51 to open said valve 50. However, a device of that simple character is not commercially practicable for the reason that the flame at the burner 3 would be extinguished every time said valve 50 closed, and unconsumed gas would be discharged through the burner whenever said valve 50 was thus automatically opened, unless the gas be manually lighted which, of course, would require the constant attendance of an operator. Therefore, attempts have been made to solve that difficulty by providing a bypass conduit around the main valve and leading to what is termed a "pilot light", viz, a small burner 4 independent of the larger burner 3, but so located with respect thereto, that it serves to ignite gas discharged through said burner 3 whenever the main valve is opened. However, those double burner structures have been found objectionable, because no provision is made therein for automatically varying the volume of gas delivered to such pilot lights in accordance with the temperature of the water heated, and the pressure and flow of gas not only differ in different locations of such heaters, but fluctuate through a considerable range in any location and, consequently, it is impossible to predetermine the rate of flow of gas to such a pilot light so that it shall be sufficient to prevent such light from being accidentally extinguished and not more than is needed for heating the water. Therefore, it has been found necessary to supply such a double burner, for an ordinary gas water heater, with an average of fifty cubic feet of gas per hour; a large portion of which is wasted because the heat of its combustion is not entirely absorbed by the water and passes off with the products of combustion from the heater.

Therefore, I provide means to automatically control the flow of all of the gas consumed whenever the valve 31 is manually opened and the initial flow of gas ignited at the burner or burners. In the form shown, the water may be heated by the single burner 3, without using said pilot burner 4, and the flow of fuel gas to that single burner is controlled not only by the main valve 50 aforesaid, but by an auxiliary valve controlling a bypass conduit, independently of the control of said main valve; both the volume of gas admitted by said main valve and the volume of gas admitted by said auxiliary valve being automatically variably determined by the same thermostatically operative means.

Therefore, as shown in Fig. IV; I provide a bypass conduit in said casing 33, from said inlet to the outlet side of said partition 40, by the duct 59 extending through said main valve 50 from within said tubular projection 52 to the outside of said tubular projection 51, and provide said projection 52 with the annular seat 60 for the auxiliary valve 61, whereby said bypass conduit 59 is automatically controlled. Said valve 61 has the stem 62 extending through said stem 51 of the main valve 50, in telescopic relation therewith, and is provided with the boss 63, projecting from said valve 61 oppositely from said stem 62, in coaxial relation therewith, to engage the spiral spring 64 by which said valve 61 is normally upheld; that spring being compressed between said valve 61 and the subjacent plug 45.

It is characteristic of each form of my invention that a single thermostatic element, exemplified by said rod 57, is operatively related to both the main and auxiliary valves, so that, under normal conditions of operation, said auxiliary valve 61 is continually held open, more or less, in accordance with the temperature of the water in said container 9; but said main valve 50 is permitted to be closed, by its spring 55, when said water is at a predetermined temperature, say, 170° F., and to remain closed until the temperature of the water falls below that point; whereupon, said main valve is opened by being thrust off its seat by said rod 57; the latter being drawn toward said valve by the contraction of said thermostatic tube 38, as the latter is cooled by the water.

In each of the three forms of my invention chosen for illustration: the axial extent of the opening of the auxiliary valve at the predetermined temperature at which the main valve is permitted to close, is predetermined by the relative length of the coaxial telescopically related stems of said main and auxiliary valves; the ends of the stems of both valves being presented in the same plane 65, directly against the adjacent end of the thermostatic rod (as shown in said Letters Patent 1,542,573 or against the rectiftying plunger 66, which is conveniently formed of metal and interposed between the ends of said valve stems and said rod. It is advantageous to employ such rectifying means, because it is easier to form a true surface at right angles to the axis of the rod 57 upon the metal element 66 than upon the rod itself which, as above noted, is of carbonaceous or ceramic material, and frangible.

In the embodiment of my invention shown in Fig. IV, which is the full size of a commercial structure for domestic use; the relative lengths of the stem 51 of the main valve 50 and of the stem 62 of the auxiliary valve 61 are such that when the upper ends thereof are presented in the same plane, said auxiliary valve 61 is held off its seat one-thousandth of an inch. Of course, the essential factors determining the effective opening of said auxiliary valve 61 are, first, the variable axial extent to which said valve is held off its seat 60, and, second, the fixed transverse extent of such opening on the low pressure side of the valve, which is limited by the inner circumference of the valve opening which, in that form, is determined by the diameter of the inner cylindrical wall 67 of said seat 60.

I find it desirable to have the area of contact of said valves with their respective seats as small as practicable to minimize the possibility of lodgment of particles of dust thereon. Therefore, in the form of my invention shown in said Letters Patent 1,542,573; I found it convenient to form such area of contact at the apices of two oppositely inclined conical surfaces upon each valve. However, such construction and arrangement imposed the necessity for extreme accuracy in facing off such contact surfaces; because the inner circumference thereof, being formed at the intersection with a conical surface; variations in the axial extent of the surfacing operation caused variations in the diameter of such inner circumference of the valve contact surface and consequent variations in said critical factor determining the effective area of opening said valves. Therefore, I have eliminated the possibility for such erroneous variation in the production of such valves by substituting a cylindrical wall for a conical wall at the inner circumference of the contact surface. Of course, such construction and arrangement is applicable to either the valve contact surface, on the valve, or on the seat with which it cooperates. In either case, the substitution of a cylindrical surface instead of a conical surface at the boundary of the valve contact plane surface 60, (which extends at right angles to the axis of the valves), permits variations in the axial extent of facing off such contact surfaces without variations in the inner diameter; which is the critical factor determining the effective area of the valve opening, because such effective area is the product of the inner circumference of such valve contact surface and the axial extent of its separation from the opposing surface.

In Fig. IV; I prefer to define the outer limit of such valve contact plane surface of the seat 60, by the conical surface 69, formed upon said projection 52 of said main valve 50. In Fig. IV; the auxiliary valve 61 has a more extensive plane face presented to said minimized valve contact surface on said seat 60. However, such relation may be reversed, as indicated in Fig. V, wherein the minimized valve contact plane surface is on the auxiliary valve 70, and is opposed by a more extensive plane surface on the seat 71. In the latter form, the inner diameter of the annular plane bearing surface of the auxiliary valve 70 becomes a critical factor in the determination of the effective area of the opening of said valve and, as shown in Fig. V, is defined by the cylindrical wall 72.

Similarly, in the form of my invention shown in Fig. VI, which is that specifically claimed in said Letters Patent 1,452,573, the minimized valve contact plane surface is on the auxiliary valve 74 and defined at its inner diameter by the cylindrical wall 75. The stem 76 of that valve is in telescopic relation with the stem 77 of the main valve 78, which has the inner diameter of its minimized valve contact plane surface 79 defined by the cylindrical wall 80.

In the enlarged illustration Fig. VII, showing the characteristic construction and arrangement of the circumferential flange 70 element of the valve and valve seats above contemplated; the minimized valve contact plane surface 68 has its inner diameter defined by the cylindrical surface 83 and its outer diameter defined by the conical surface 75 84; thus affording a desirable mass of metal to support and prevent distortion of said minimized surface.

In each of the three forms of my invention, shown respectively in Figs. IV, V and VI, in calibration of the telescopically related main and auxiliary valve stems to insure that the auxiliary valve shall be off its seat to a predetermined axial extent, when the main valve reaches and is just closed upon its seat; I find it convenient to insert a gauge plate 86 between the two valves and to hold them respectively in close contact therewith, while grinding off the free ends of said valve stems in a common plane 65. Of course, such gauge plate may be a mere washer which is fited to encircle the inner one of the two stems during that calibrating operation, but subsequently removed.

The effective area of opening of said valves corresponding with a given axial movement thereof being proportionate to the inner circumference of the surface provided for the contact of the valve with its seat, as above explained; and the effective area of opening being, of course, greater with a valve of large diameter than with a valve of smaller diameter; it might be assumed that a single valve could be designed of sufficient diameter to admit the maximum flow of gas required and yet be adjustable to the minimum required. However, the axial movement is so slight that it is impossible to attain, with a single valve, the maximum flow desired and the accurate regulation required for the minimum flow. Therefore, it is essential to the attainment of the effect above contemplated to employ at least two valves. Of course, two valves of the proper relative sizes might be operated by respectively distinct thermostatic devices. However, such construction and arrangement would not only double the cost of the thermostatic elements, but would fail to attain the precise coordination of operation of the two valves which is attained by the operation of both valves by the same thermostatic element. Therefore, it is characteristic of each of the forms of my invention above described that it includes not only two valves of respectively different capacities, but a single thermostatic element arranged to operate both such valves.

Of course, the temperature at which said main valve 50 closes depends upon the relative effective length of said thermostatic elements 38 and 57. Therefore, in a form of my invention shown in said Letters Patent No. 1,542,573, I provided such valve structures with individually adjustable means to variably determine such closing temperature. However, it is desirable to lessen the cost of such structures by so calibrating said elements 38 and 57, during their manufacture, as to obviate the necessity for any subsequent adjustment thereof. Therefore, I prefer to not only cut the rods 57 to a precise standard length, while maintaining them at a standard temperature; but to form the seat for the closure cap 58 in said thermostatic tube element 38 after the latter is screwed into the valve casing 33, which distance is thus determined by accurate measurement during the formation of said seat and at a precisely predetermined distance from said valve seat 41, and while maintaining the structure at a standard temperature; so that said cap not only serves as a water-tight closure for the tube 38, but its location predetermines the temperature at which said main valve 50 shall close. Said cap may be conveniently made of a sheet metal punching, which is preferably compressed, as a coin is minted, to insure absolute uniformity in a series of such caps, as far as the inner faces thereof are concerned, so that the position of the latter is precisely predetermined by contact of each such cap 58 with its seat in its tube 38.

However, I do not desire to limit myself to the precise details of construction and arrangement herein set forth, as it is obvious that various modifications may be made therein without departing from the essential features of my invention, as defined in the appended claims.

I claim:

1. The combination with a valve casing having a large main port and a smaller, auxiliary, bypass port independently leading from an inlet to an outlet in said casing; of two valves in coaxial relation respectively arranged to independently control said ports; said main valve having an annular seat for said auxiliary valve, and said bypass port extending through said main valve, but independently of the control of the latter; the effective area of opening of each of said valves being variable in accordance with the axial movement of said valves, but limited by the diameter of respective cylindrical surfaces, in coaxial relation with said valves; whereby the effective opening of said valves for any axial movement thereof is predetermined by the diameter of said cylindrical surfaces, independently of the axial extent of said valves; closing means continually urging said valves to close said ports; thermostatic means, including a single non-metallic rod common to both said valves, constructed and arranged to open both said valves, and permit them to be closed, by said closing means, independently of said thermostatic means, in accordance with changes in temperature; and a single metallic rectifying plunger interposed between said rod and stems and common to both of said stems.

2. The combination with a valve casing having a large main port and a smaller, auxiliary, bypass port independently leading from an inlet to an outlet in said casing; of two valves in coaxial relation respectively arranged to independently control said ports; said bypass port extending through said main valve, but independently of the control of the latter; closing means continually urging said valves to close said ports; thermostatic means, including a single non-metallic rod common to both said valves, constructed and arranged to open both said valves, and permit them to be closed, by said closing means, independently of said thermostatic means, in accordance with changes in temperature; and a single metallic rectifying plunger interposed between said rod and stems and common to both of said stems.

3. The combination with a valve casing having a large main port and a smaller, auxiliary, bypass port independently leading from an inlet to an outlet in said casing; of two valves in coaxial relation respectively arranged to independently control said ports; said bypass port extending through said main valve, but independently of the control of the latter; closing means continually urging said valves to close said ports; thermostatic means, including a single non-metallic rod common to both said valves, constructed and arranged to open both said valves, and permit them to be closed, by said closing means, independently of said thermostatic means, in accordance with changes in temperature.

4. The combination with a valve casing having a large main port and a smaller, auxiliary, bypass port independently leading from an inlet to an outlet in said casing; of two valves in coaxial relation respectively arranged to independently control said ports; said bypass port extending through said main valve, but independently of the control of the latter; closing means continually urging said valves to close said ports; thermostatic means, including a single non-metallic rod common to both said valves, constructed and arranged to open both said valves, and permit them to be closed, by said closing means, independently of said thermostatic means, in accordance with changes in temperature; the effective area of opening of each of said valves being variable in accordance with the axial movement of said valves, but limited by the diameters of respective cylindrical surfaces in coaxial relation with said valves; whereby the effective opening of said valves for any axial movement thereof is predetermined by the diameters of said cylindrical surfaces, independently of the axial extent of said valves.

5. The combination with a valve casing having a large main port and a smaller, auxiliary, bypass port, both leading from an inlet to an outlet in said casing; of a main valve and an auxiliary valve respectively arranged to separately control said ports; said main valve having said auxiliary port opening through it, and having a seat for said auxiliary valve; closing means continually urging said valves to close said ports; and thermostatic means, common to both said valves, constructed and arranged to open both said valves, and permit them to be closed, by said closing means, independently of said thermostatic means, in accordance with changes in temperature.

6. The method of coordinately calibrating multiple valve members including respective stems fitted for reciprocation in coaxial telescopic relation and respectively carrying annular disks having parallel plane valve contact faces; which consists in holding said members with said faces in predetermined spaced relation, with gauging means, while reducing the ends of said stems to a common plane at a predetermined distance from said faces and at right angles to their common axis, and while maintaining said valve members at a substantially constant predetermined temperature.

7. The method of coordinately calibrating a multiple valve including respective stems fitted for reciprocation in coaxial telescopic relation and respectively carrying annular disks having valve contact faces; which consists in holding said members with said faces in predetermined spaced relation, while reducing the ends of said stems to a predetermined common plane at right angles to their common axis.

8. The method of coordinately calibrating multiple valve members including respective stems fitted for reciprocation in coaxial telescopic relation and respectively carrying valve contact faces, extending transversely to their axes; which consists in holding said disk members in predetermined relation with gauging means, while reducing the ends of said stems to a common plane, at right angles to their axes and while maintaining said valve members at a substantially constant predetermined temperature.

9. The method of coordinately calibrating multiple valve members including respective stems fitted for reciprocation in coaxial telescopic relation and respectively carrying valve contact faces, extending transversely to their axes; which consists in holding said members with said faces in predetermined relation, while reducing the ends of said stems to a common plane, transverse to their axes.

10. The method of coordinately calibrating multiple valve members including respective stems fitted for reciprocation in coaxial telescopic relation and respectively carrying valve contact faces, extending transversely to their axes; which consists in holding said members with said faces in predetermined relation, while reducing the ends of said stems to a predetermined extent.

11. The method of calibrating a thermostatically controlled valve structure which consists in providing a valve casing, having a valve seat, with a metallic thermostatic tube rigidly connected with said valve seat; forming, at the free end of said tube, a seat for a closure cap at a predetermined distance from said valve seat; while maintaining the structure at a predetermined temperature; forming a closure cap to fit said closure seat in predetermined invariable relation therewith, and rigidly connecting said closure cap with said tube in immovable water-tight contact with said closure seat.

In testimony whereof, I have hereunto signed my name at Philadelphia, Pennsylvania, this fifteenth day of April, 1925.

ARTHUR E. PAIGE.

opening of said valves for any axial movement thereof is predetermined by the diameters of said cylindrical surfaces, independently of the axial extent of said valves.

5. The combination with a valve casing having a large main port and a smaller, auxiliary, bypass port, both leading from an inlet to an outlet in said casing; of a main valve and an auxiliary valve respectively arranged to separately control said ports; said main valve having said auxiliary port opening through it, and having a seat for said auxiliary valve; closing means continually urging said valves to close said ports; and thermostatic means, common to both said valves, constructed and arranged to open both said valves, and permit them to be closed, by said closing means, independently of said thermostatic means, in accordance with changes in temperature.

6. The method of coordinately calibrating multiple valve members including respective stems fitted for reciprocation in coaxial telescopic relation and respectively carrying annular disks having parallel plane valve contact faces; which consists in holding said members with said faces in predetermined spaced relation, with gauging means, while reducing the ends of said stems to a common plane at a predetermined distance from said faces and at right angles to their common axis, and while maintaining said valve members at a substantially constant predetermined temperature.

7. The method of coordinately calibrating a multiple valve including respective stems fitted for reciprocation in coaxial telescopic relation and respectively carrying annular disks having valve contact faces; which consists in holding said members with said faces in predetermined spaced relation, while reducing the ends of said stems to a predetermined common plane at right angles to their common axis.

8. The method of coordinately calibrating multiple valve members including respective stems fitted for reciprocation in coaxial telescopic relation and respectively carrying valve contact faces, extending transversely to their axes; which consists in holding said disk members in predetermined relation with gauging means, while reducing the ends of said stems to a common plane, at right angles to their axes and while maintaining said valve members at a substantially constant predetermined temperature.

9. The method of coordinately calibrating multiple valve members including respective stems fitted for reciprocation in coaxial telescopic relation and respectively carrying valve contact faces, extending transversely to their axes; which consists in holding said members with said faces in predetermined relation, while reducing the ends of said stems to a common plane, transverse to their axes.

10. The method of coordinately calibrating multiple valve members including respective stems fitted for reciprocation in coaxial telescopic relation and respectively carrying valve contact faces, extending transversely to their axes; which consists in holding said members with said faces in predetermined relation, while reducing the ends of said stems to a predetermined extent.

11. The method of calibrating a thermostatically controlled valve structure which consists in providing a valve casing, having a valve seat, with a metallic thermostatic tube rigidly connected with said valve seat; forming, at the free end of said tube, a seat for a closure cap at a predetermined distance from said valve seat; while maintaining the structure at a predetermined temperature; forming a closure cap to fit said closure seat in predetermined invariable relation therewith, and rigidly connecting said closure cap with said tube in immovable water-tight contact with said closure seat.

In testimony whereof, I have hereunto signed my name at Philadelphia, Pennsylvania, this fifteenth day of April, 1925.

ARTHUR E. PAIGE.

---

Certificate of Correction.

It is hereby certified that in Letters Patent No. 1,587,177, granted June 1, 1926, upon the application of Arthur E. Paige, of Philadelphia, Pennsylvania, for an improvement in "Thermostatically-Controlled Valves," errors appear in the printed specification requiring correction as follows: Page 3, line 97, after the number "1,542,573" insert a parenthesis; page 4, line 92, for the misspelled word "fited" read *fitted;* page 5, lines 17 to 19, strike out the words "which distance is thus determined by accurate measurement during the formation of said seat" and insert the same before the word "and" in line 21; and that the said Letters Patent should be read with these corrections therein that the same may conform to the record of the case in the Patent Office.

Signed and sealed this 29th day of June, A. D. 1926.

[SEAL.]

M. J. MOORE,
*Acting Commissioner of Patents.*

Certificate of Correction.

It is hereby certified that in Letters Patent No. 1,587,177, granted June 1, 1926, upon the application of Arthur E. Paige, of Philadelphia, Pennsylvania, for an improvement in "Thermostatically-Controlled Valves," errors appear in the printed specification requiring correction as follows: Page 3, line 97, after the number "1,542,573" insert a parenthesis; page 4, line 92, for the misspelled word "fited" read *fitted;* page 5, lines 17 to 19, strike out the words "which distance is thus determined by accurate measurement during the formation of said seat" and insert the same before the word "and" in line 21; and that the said Letters Patent should be read with these corrections therein that the same may conform to the record of the case in the Patent Office.

Signed and sealed this 29th day of June, A. D. 1926.

[SEAL.]

M. J. MOORE,
*Acting Commissioner of Patents.*